C. SCHULTHES AND B. MORA.
WIND MOTOR.
APPLICATION FILED NOV. 25, 1921.

1,430,406.

Patented Sept. 26, 1922.
3 SHEETS—SHEET 1.

Inventors:
Carl Schulthes
Bernhard Mora
by [Attorney signature]
Attorney.

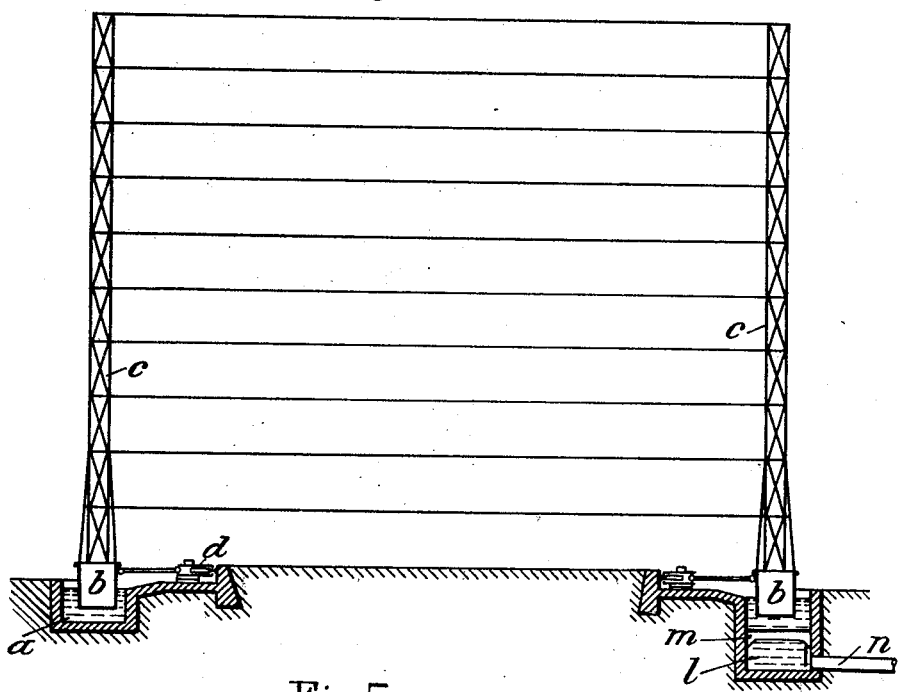
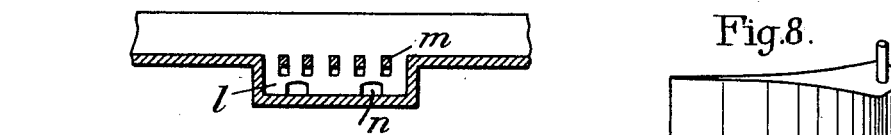
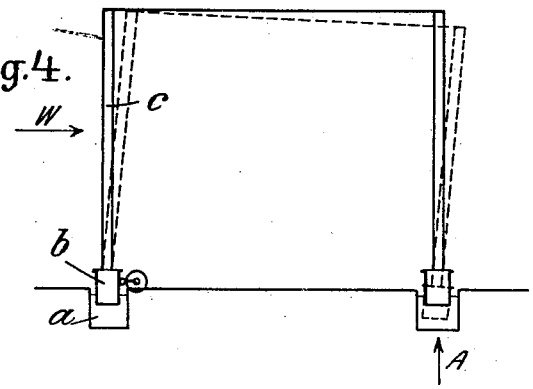
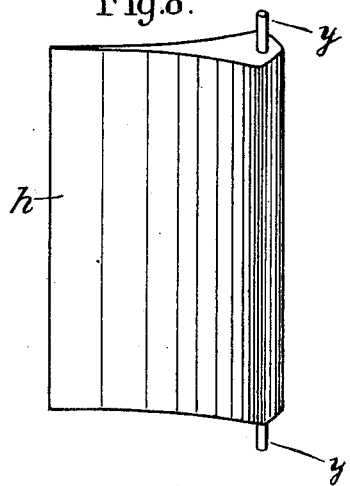

Patented Sept. 26, 1922.

1,430,406

UNITED STATES PATENT OFFICE.

CARL SCHULTHES, OF BERLIN, AND BERNHARD MORA, OF LUBECK, GERMANY.

WIND MOTOR.

Application filed November 25, 1921. Serial No. 517,762.

*To all whom it may concern:*

Be it known that we, CARL SCHULTHES and BERNHARD MORA, both German citizens, residing at Berlin and Lubeck, Germany, respectively, have invented certain new and useful Improvements in Wind Motors (for which we have filed applications in Germany, January 6, 1920, February 26, 1921, June 1, 1921, June 1, 1921; Holland, October 28, 1921), of which the following is a specification.

Our invention relates to wind motors and one of its objects is to provide a motor in which the energy of the wind is utilised on a large scale.

In the drawings affixed to this specification and forming part thereof, a wind motor embodying my invention is illustrated diagrammatically by way of example. In the drawings—

Fig. 1 is a plan view,

Fig. 2 a cross section of our improved motor,

Fig. 4 is a diagrammatic elevation showing the manner in which the wind forces are balanced in the motor.

Fig. 5 is a section of the tank in which the base of the motor is kept floating, Fig. 8 is a perspective view of a vane.

Figure 1:
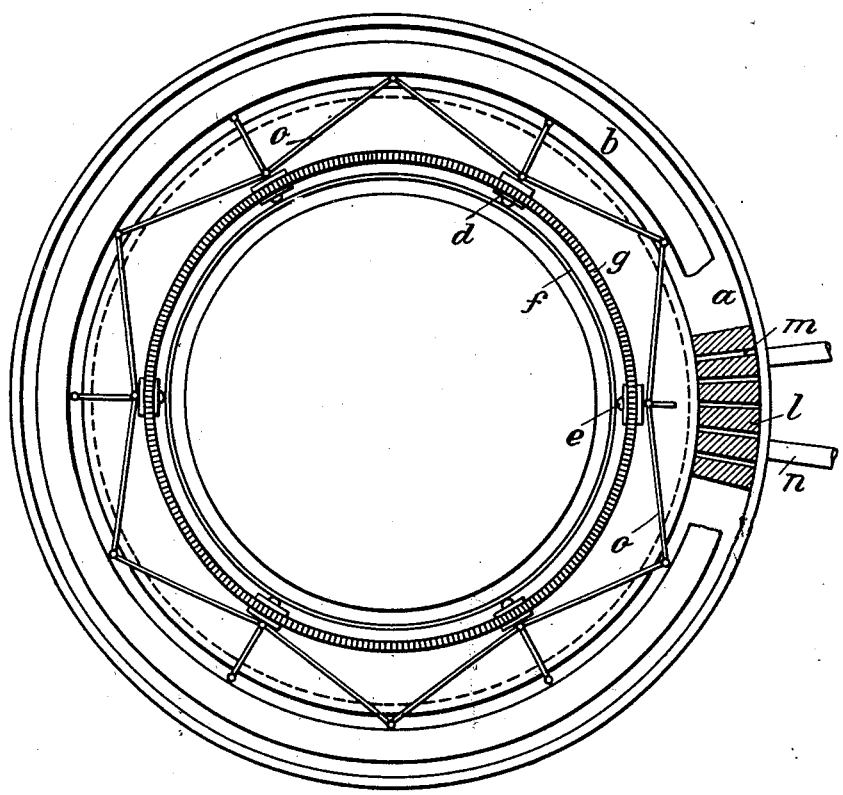
Figure 3:
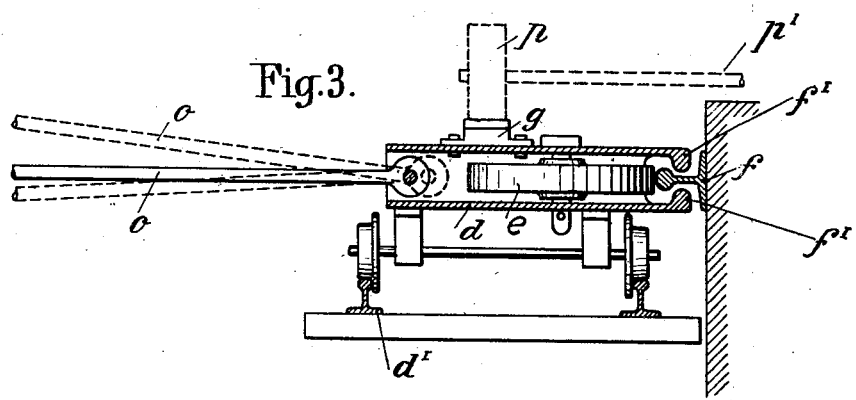
Fig. 3 is a detail illustrating on a larger scale one of the trucks on which the motor is supported.
Figure 6:
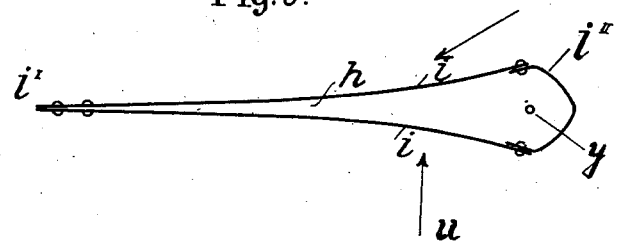
Fig. 6 is an end view of a vane.
Figure 9:
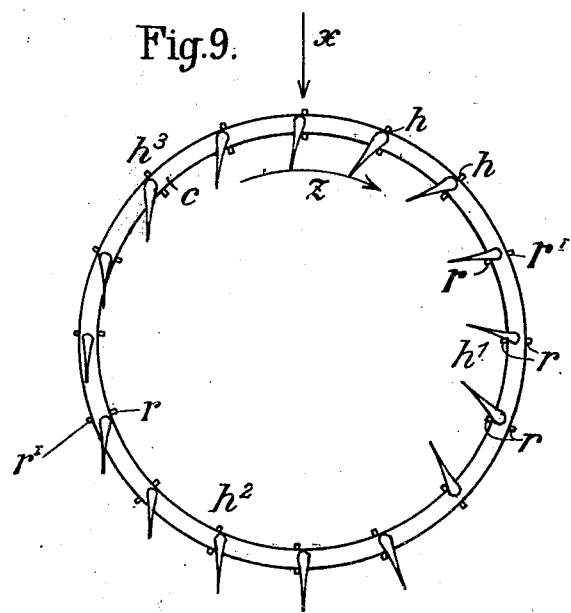
Fig. 9 is a diagrammatic plan view, illustrating the operation of the motor.

Referring first to Figs. 1, 2 and 9, the novel motor comprises a drumshaped frame $c$ to which the vanes or pressure surfaces $h$ are pivotally attached. The frame $c$ is secured to a pontoon or other float $b$ which is arranged in an annular tank $a$ filled with water. The vanes $h$ are arranged in one or several circles and adapted to turn on pins $y$. They are held at a predetermined angle to the tangential direction by catches $r$ and $r'$. Preferably the vanes $h$ are formed as hollow bodies provided with two symmetrical concave pressure faces $i$, as shown in Fig. 6. In the modification illustrated in Fig. 7, the two faces $i$ are connected by a right and left handed screw $q$ extending across the thickest portion of the vane. By turning this screw, the vane is deformed so that the cambering of the faces $i$ is varied, as indicated by the dotted lines $k$. At the thin edge of the vane the two side walls $i$ are connected by rivets $i'$ or the like. The thick edge is formed by a sheet metal cap $i''$, or the like To the inside of the float $b$, compression and tension rods $o$ are pivoted at one end, their other ends being pivoted to trucks $d$ (Fig. 2), running on a circular track $d'$ and provided with rollers $e$ adapted to rotate about vertical pins and engaging a horizontal circular track $f$ which takes up the horizontal forces. If desired, the truck $d$ may be provided with finger like projections $f'$ adapted to engage the head of the rail $f$. The trucks support a circular rack $g$, engaged by pinions $p$ on horizontal shafts $p'$.

The annular tank $a$ is provided at the bottom with one or a plurality of recesses $l$ bridged by transverse girders $m$. Tubes $n$ adapted to be closed by valves are connected to the recesses $l$.

The operation of the novel motor is as follows:

Assuming the wind to flow in the direction of the arrow $x$ in Fig. 9 owing to the inclined position of the vanes $h$ at the point where the wind $x$ strikes the motor, the tangential pressure component of the wind force will exert a turning moment on the frame $c$ in the direction of the arrow $z$, when passing the position $h^1$ in which they are held by the catches $r$, the vanes are turned on their pins $y$ exactly as the sails of a ship are reversed when wearing, and engage the catches $r'$. The wind now strikes the opposite faces of the vanes in the direction of the arrow $u$ in Fig. 6 and keeps the frame $c$ rotating. When the vanes have passed the position $h^2$, they no longer engage the catches $r'$ but adjust themselves to the direction of the wind like weathercocks and become inoperative until the position $h^3$ is reached where they again engage the catches $r$.

Figure 7:
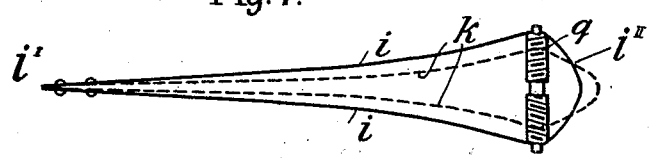
Fig. 7 is a similar view of a modification illustrating means for varying the cambering of the vane.

By varying the cambering of the pressure surfaces $i$ by means of the device illustrated in Fig. 7 or by any other means, the pressure which the wind exerts on the vanes can be varied. A mechanism for reversing the vanes is not required but may be provided if desired.

As will be seen from the foregoing description, the motor has no fixed vertical axis of rotation but is capable of being displaced to a certain extent in a horizontal and vertical direction. In a strong wind it can assume an inclined position as illustrated in Fig. 4. The buoyancy A of the float $b$ and the wind force W balance one another. In such an arrangement it is not necessary to take up the great forces arising in a structure 240 feet high and having a diameter of 300 feet by a solid shaft. The vertical forces are counterbalanced by the buoyancy of the float $b$ and the vertical ones by the pressure of the truck $d$ on the rail $f$. Preferably the rods $o$ are so designed as to permit some elastic deformation.

When the frame $c$ is compelled to assume an inclined position, it will merely pivot about the inner edge of the float at the weather side so that it cannot capsize. The tilting movement of the wind force is counteracted by the buoyancy at the lee side which acts with a leverage equal to the diameter of the frame $c$. The buoyancy at the lee side can be made as high as desired by suitably dimensioning the float $b$ and the pit $a$. Motion is imparted to the trucks $d$ by the rotating frame $c$ and the circular track $g$ shares their rotary movement so that the pinions $p$ and their shafts $p'$ are also rotated and can be made to drive electric or other machinery. The rack is held in a fixed position by the trucks $d$ independently of the inclination of the float $b$.

The recesses $l$ serve for making repairs in and for renewing the paint on the float $b$ without lifting it from the tank $a$. The water is allowed to escape whereupon the float $b$ settles on the bottom of the tank and the transverse girders $m$, respectively. The recesses $l$ are such dimensions as to enable a man to enter them. By displacing the float $b$ gradually, its entire bottom can be made accessible.

We wish it to be understood that we do not desire to be limited to the exact details of construction shown and described for obvious modifications will occur to a person skilled in the art.

We claim:

1. In a wind motor in combination, a substantially cylindrical open-work structure, vanes attached to said structure, a float secured to the base of said structure and means connected with said structure for transmitting power.

2. In a wind motor in combination, a substantially cylindrical open-work structure, vanes pivotally attached to said structure, a float secured to the base of said structure and means connected with said structure for transmitting power.

3. In a wind motor in combination, a substantially cylindrical open-work structure, vanes pivotally attached to said structure, catches for limiting the movement of said vanes about their pivots, a float secured to the base of said structure and means connected with said structure for transmitting power.

4. In a wind motor in combination, a substantially cylindrical open-work structure, vanes of V-section attached to said structure, a float secured to the base of said structure and means connected with said structure for transmitting power.

5. In a wind motor in combination, a substantially cylindrical open-work structure, vanes of V-section means for varying the sectional angle of said vanes attached to said structure, a float secured to the base of said structure and means connected with said structure for transmitting power.

6. In a wind motor in combination, a substantially cylindrical open-work structure, vanes attached to said structure, a float secured to the base of said structure, a circular tank adapted to take up said float, a circular track concentric with said tank, a ring of trucks adapted to run on said track, connection between said trucks and said structure and means connected with said structure for transmitting power.

7. In a wind motor in combination, a substantially cylindrical open-work structure, vanes attached to said structure, a float secured to the base of said structure, a circular tank adapted to take up said float, a circular track concentric with said tank, a ring of trucks adapted to run on said track, connection between said trucks and said structure, a wheel on each truck adapted to rotate about a vertical axis, an annular guide rail concentric with said track adapted to cooperate with said wheels, an arm on each truck adapted to grip said rail and means connected with said structure for transmitting power.

In testimony whereof we affix our signatures.

CARL SCHULTHES.
BERNHARD MORA.

Witnesses:
 KARL HALLBAUM,
 ALBERT BOHR.